Patented Aug. 9, 1932

1,870,877

UNITED STATES PATENT OFFICE

OMAR H. SMITH, OF WEST ENGLEWOOD, AND GEORGE W. JARGSTORFF, OF GLEN ROCK, NEW JERSEY, ASSIGNORS TO THE NAUGATUCK CHEMICAL COMPANY, OF NAUGATUCK, CONNECTICUT, A CORPORATION OF CONNECTICUT

PRODUCTION OF STYROLS

No Drawing.  Application filed August 22, 1930.  Serial No. 477,183.

This invention relates to improvements in the production of styrols.

It has been found that when halogenated alkyl benzols, preferably the alpha and beta halogenated alkyl benzols, are heated in the presence of relatively small amounts of the reaction products of acids and organic bases, that the said reaction products act as catalysts in the removal of halogen hydride from the halogenated compounds. The reaction products include both the salts formed with inorganic acids or with organic acids. The invention also contemplates reclaiming from the higher boiling by-products that are produced by the heat catalytic treatment with the so-called salts of organic bases, additional styrol and ethyl benzol, thereby increasing the yield of styrol that is recoverable from the original halogenated alkyl benzol. The by-products consist of the residue from a steam distillation and the high-boiling residue which remains after removing the styrol-bearing fraction from the steam distillate by fractionation. The ethyl benzol can be reworked if desired into the form of the halogenated compound by halogenation of the same and reincluded, if desired, in the original catalytic treatment. Examples of catalysts are salts formed by the reaction of pyridine with hydrochloric acid, sulphuric acid, phosphoric acid and acetic acid respectively; salts formed by the reaction between dibenzyl amine and hydrochloric acid, sulphuric acid and phosphoric acid respectively; salts formed by the reaction between diethyl amine and hydrochloric acid, sulphuric acid and phosphoric acid respectively and salts formed by the reaction of aniline with hydrochloric acid, sulphuric acid and phosphoric acid respectively.

The following embodiments, in which the parts are by weight, illustrate the invention but are not to be construed as limiting thereof.

*Example 1.*—100 parts of ethyl benzol are chlorinated in the dark at 100–110° C. until approximately 15 parts of chlorine by weight have been absorbed. The chlorinated mixture is fractionated and 44.5 parts boiling below 155° C. are obtained. Tests show that this fraction can be considered unchanged ethyl benzol. The residue is refluxed for 2 1/2 hours at 155–175° C. with approximately 3.5 parts of a salt formed by the reaction between pyridine and hydrochloric acid, after which the reaction mixture is separated from the catalyst and steam distilled. 46.6 parts of steam distillate having a styrol concentration of approximately 51% are obtained.

*Example 2.*—100 parts of ethyl benzol are chlorinated in the dark at 100–110° C. until approximately 15 parts of chlorine by weight are obtained. The chlorinated mixture is fractionated and 48.6 parts of unchanged ethyl benzol obtained. The residue is refluxed for 2 1/2 hours at 155–175° C. after adding 5.5 parts of a salt formed by the reaction between pyridine and acetic acid, after which the reaction mixture is separated from the catalyst and steam distilled. 43.6 parts of steam distillate having a styrol concentration of 53.9% are obtained.

*Example 3.*—100 parts of ethyl benzol are chlorinated in the dark at 100–110° C. until approximately 15 parts of chlorine by weight are absorbed. The chlorinated mixture is fractionated and 51.2 parts of unchanged ethyl benzol are obtained. The residue is refluxed for 2 1/2 hours at 155–175° C after adding 3.5 parts of a salt formed by the reaction between pyridine and sulfuric acid, after which the reaction mixture is separated from the catalyst and steam distilled. 35.5 parts of steam distillate having a styrol concentration of 49.5% are obtained. 20 parts of this steam distillate boiling below 165° C. are isolated and heated in a sealed tube for 20 hours at 180° C. 11.2 grams of styrol resin are obtained from the heated mixture.

*Example 4.*—100 parts of ethyl benzol are chlorinated in the dark at 100–110° C. until approximately 15 parts by weight of chlorine have been absorbed. The chlorinated mixture is fractionated and 51.2 parts of unchanged ethyl benzol are obtained. The residue is refluxed for 2 1/2 hours at 155–175° C. after adding 3.5 grams of a salt formed by the reaction between pyridine and phosphoric acid, after which the reaction mixture is separated from the catalyst and steam distilled.

39.8 parts of steam distillate having a styrol concentration of 47.7% are obtained.

*Example 5.*—100 parts of ethyl benzol are chlorinated in the dark at 100–111° C. until aproximately 15 parts by weight of chlorine are absorbed. The chlorinated mixture is fractionated and 46.5 parts of unchanged ethyl benzol are obtained. The residue is heated under reflux for 2 1/2 hours at 155–175° C. after adding 2.5 grams of a salt formed by the reaction between diethyl amine and hydrochloric acid, after which the reaction mixture is separated from the catalyst and steam distilled. 39.5 parts of steam distillate having a styrol concentration of 51.7% are obtained. Instead of hydrochloric acid, sulphuric or phosphoric acids may be reacted with the amine to form a salt.

*Example 6.*—100 parts of ethyl benzol are chlorinated in the dark at 100–110° C. until approximately 15 parts chlorine by weight are absorbed. The chlorinated mixture is fractionated and 45 parts of unchanged ethyl benzol are obtained. The residue is heated under reflux for 2 1/2 hours at 155–175° C. after adding 3.8 grams of a salt formed by the reaction between dibenzyl amine and sulfuric acid, after which the reaction mixture is separated from the catalyst and steam distilled. 40.2 parts of steam distillate having a styrol concentration of 47.3% are obtained. The steam distillate is fractionated and 23 parts which boiled below 165° C. are heated in a sealed tube for 20 hours at 180° C. The resin formed is separated in the usual manner. 12.3 parts of meta styrol are obtained.

*Example 7.*—100 parts of ethyl benzol are chlorinated in the dark at 100–110° C. until approximately 15 parts by weight of chlorine are absorbed. The chlorinated mixture is fractionated and 41 parts of unchanged ethyl benzol obtained. The residue is heated under reflux for 2 1/2 hours at 155–175° C. after adding 3 parts of a salt formed by the reaction between dibenzyl amine and hydrochloric acid, after which the reaction mixture is separated from the catalyst and steam distilled. 33.7 parts of steam distillate having a styrol concentration of 45.2% are obtained.

*Example 8.*—100 parts of ethyl benzol are chlorinated in the dark at 100–110° C. until approximately 15 parts of chlorine by weight are absorbed. The chlorinated mixture is fractionated and 41 parts of unchanged ethyl benzol obtained. The residue is heated under reflux for 2 1/2 hours at 155–175° C. after adding 5 parts of a salt formed by the reaction between dibenzyl amine and phosphoric acid, after which the reaction mixture is separated from the catalyst and steam distilled. 33.7 parts of steam distillate having a styrol concentration of 37.4% are obtained.

*Examlpe 9.*—100 parts of ethyl benzol are chlorinated in the dark at 100–110° C. until approximately 15 parts by weight of chlorine are absorbed. The chlorinated mixture is fractionated and 44 parts of unchanged ethyl benzol obtained. The residue was heated under reflux for 2 1/2 hours at 155–175° C. after adding 4.3 grams of a salt formed by the reaction between aniline and sulfuric acid, after which the reaction mixture is separated from the catalyst and steam distilled. 34 parts of steam distillate having a styrol concentration of 38.7% are obtained. 20 parts of the steam distillate which boiled below 165° C. are heated under reflux for 60 hours at 100° C. in the presence of water. The resin formed by this treatment is separated and dried in the usual manner. 8 parts of normally tough meta styrol are obtained. Instead of sulphuric acid, phosphoric or hydrochloric acids may be reacted with aniline to form a salt.

*Example 10.*—100 parts of ethyl benzol are chlorinated in the dark at 100–110° C. until approximately 15 parts of chlorine by weight are absorbed. The chlorinated mixture is fractionated and 59.3 parts of unchanged ethyl benzol are obtained. The residue is heated under reflux for 2 1/2 hours at 155–175° C. after adding 3.5 grams of a salt formed by the reaction between pyridine and hydrochloric acid, after which the reaction mixture is separated from the catalyst and steam distilled. The steam distillate is fractionated and 25.5 parts of the distillate with a styrol concentration of 62.7% are isolated in a fraction boiling below 165° C. The residue from this fractionation together with the residue from the steam distillation are passed through a cracking tube producing ethyl benzol and styrol which is purified by the usual methods. 1.9 parts of styrol and 2.8 parts of ethyl benzol are obtained from the residues.

In the examples the catalyst subsequent to the heating is allowed to settle to the bottom of the container, after which the reaction mixture is siphoned off. In this way the catalyst may be used repeatedly, while the reaction mixture is purified and concentrated to a form suitable for polymerizing by steam distilling and fractionating.

Besides the salts indicated other salts may be mentioned which operate as catalysts such as salts of piperidine, pyridine alkaloids and quinoline alkaloids including quinine. A small amount of the organic base may be used as a catalyst where it would react with free halogen acid present in and released by heat from the halogenated alkyl benzol to form a small amount of a salt of the organic base. For instance about 1/20 of a molecule of base is sufficient to remove substantially all the hydrochloric acid from one molecule of chlorinated ethyl benzol by catalysis.

Having thus described our invention, what we claim and desire to protect by Letters Patent is:

1. A method of producing styrol from a halogenated alkyl benzol by removal of halogen acid therefrom which comprises heating a halogenated alkyl benzol in the presence of a small amount of a reaction product of an organic base and an acid, the proportion of said reaction product being such as to enable it to function only as a catalyst, and subsequently recovering styrol.

2. A method of producing styrol from a halogenated alkyl benzol by removal of halogen acid therefrom which comprises heating to approximately 155–175° C. a chlorinated ethyl benzol in the presence of a small amount of a reaction product of an organic base and an acid, the proportion of said reaction product being such as to enable it to function only as a catalyst, and subsequently recovering styrol.

3. A method of producing styrol from a halogenated alkyl benzol by removal of halogen acid therefrom which comprises heating a mixture of a halogenated alkyl benzol in the presence of a small amount of a reaction product of an acid and pyridine, the proportion of said reaction product being such as to enable it to function only as a catalyst, and subsequently recovering styrol.

4. A method of producing styrol from a halogenated alkyl benzol by removal of halogen acid therefrom which comprises heating a halogenated alkyl benzol in the presence of a small amount of a reaction product of pyridine and a strong inorganic acid, the proportion of said reaction product being such as to enable it to function only as a catalyst, and subsequently recovering styrol.

5. A method of producing styrol from a halogenated alkyl benzol by removal of halogen acid therefrom which comprises heating a chlorinated ethyl benzol and a small amount of the reaction product of hydrochloric acid and pyridine, the proportion of said reaction product being such as to enable it to function only as a catalyst, and subsequently recovering styrol.

6. A method of producing styrol from a halogenated alkyl benzol by removal of halogen acid therefrom which comprises heating a chlorinated ethyl benzol and a small amount of the reaction product of hydrochloric acid and an amine selected from the group consisting of pyridine, dibenzylamine, diethylamine and aniline, the proportion of said reaction product being such as to enable it to function only as a catalyst, and subsequently recovering styrol.

Signed at Passaic, county of Passaic, State of New Jersey, this 18th day of August, 1930.

OMAR H. SMITH.
GEORGE W. JARGSTORFF.